Feb. 8, 1966  E. M. DAHL ET AL  3,233,395

REEL AUGER

Filed June 21, 1963  2 Sheets-Sheet 1

INVENTORS
Edwin M. Dahl
Crawford S. Swenson

BY Robert E. Klene
ATTORNEY

Feb. 8, 1966　　E. M. DAHL ET AL　　3,233,395
REEL AUGER
Filed June 21, 1963　　2 Sheets-Sheet 2
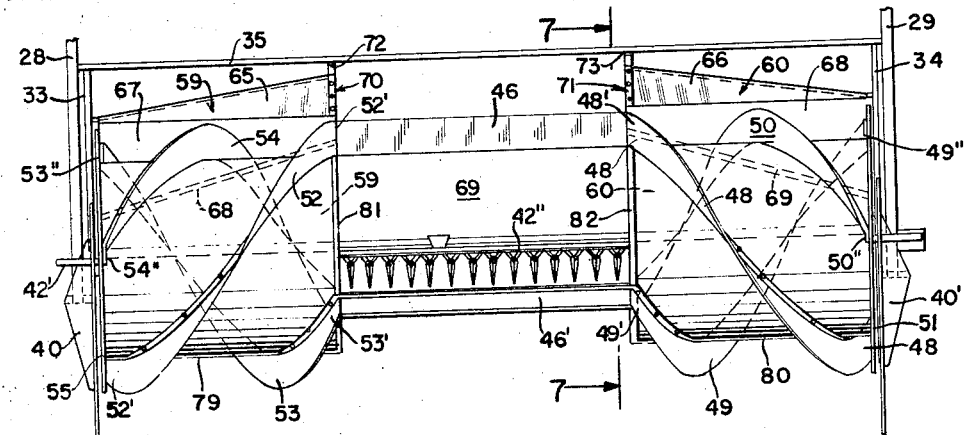
FIG. 4.
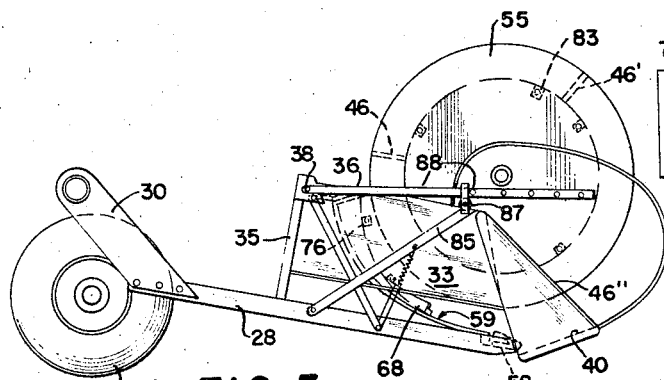
FIG. 5.
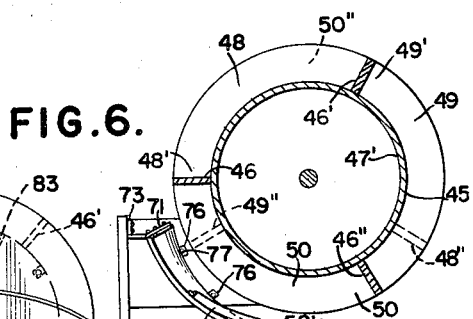
FIG. 6.
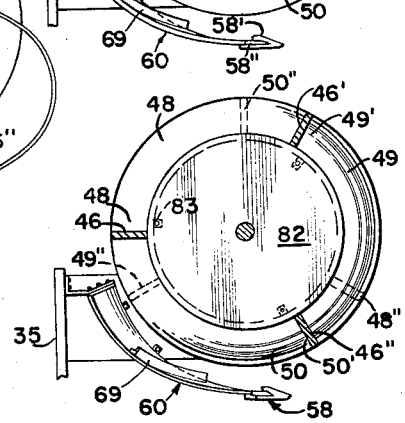
FIG. 7.
FIG. 8.
INVENTORS
Edwin M. Dahl
Crawford S. Swenson
BY Robert E. Kleve
ATTORNEY United States Patent Office 3,233,395
Patented Feb. 8, 1966

3,233,395
REEL AUGER
Edwin M. Dahl, 424 1st Ave. E., and Crawford S. Swenson, 418 2nd Ave. E., both of Williston, N. Dak.
Filed June 21, 1963, Ser. No. 289,672
9 Claims. (Cl. 56—192)

This invention relates to agricultural harvest equipment and the like; more particularly the invention relates to the reeling, cutting and conveying of hay, grain and the like.

It is an object of this invention to provide a novel harvester reel and auger device for windrowing crops as well as for adaptation to a combine, and which device acts to reel the crop against a cutter bar, cut the crop and thereafter auger the cut crop along a platform to an opening.

It is a further object of the invention to provide a novel rotating harvester reel having a cylindrical drum, with a plurality of blades arranged helically along the drum and which act to reel in the crop against the cutter bar and onto a curved trough member, with the spiral blades thereafter cooperating with the trough member to auger the cut crop along the trough to an opening.

It is a further object of the invention to provide a novel harvester reel and augering device which can be simply manufactured and can be operated with a minimum number of parts.

It is a further object of the invention to provide a novel harvester reel and augering device which eliminates the need for conventional canvases or moving platforms to move the crop along the length of the reel to a center or end area for windrowing.

Further objects and advantages of the invention will become apparent as the description proceeds and when taken in conjunction with the accompanying drawings wherein:

FIGURE 4 is a top view similar to FIGURE 1, with some of the conventional components removed for clarity, and disclosing the second form of reel auger;

FIGURE 5 is a side elevational view of the swathing attachment;

FIGURE 6 is a cross-sectional view of the first form of harvester reel auger, taken along line 6—6 of FIGURE 1;

FIGURE 7 is a cross-sectional view of the second form of the reel auger invention taken along line 7—7 of FIGURE 4; and FIGURE 8 is a perspective view of the auger troughs and cutter for both forms of the invention.

Briefly stated, the invention comprises a swathing attachment for mounting in front of a tractor for cutting and windrowing crops comprising a drumlike harvester reel and augering device having a cutter bar mounted directly beneath and with the drumlike reel and auger extending substantially the length of the cutter bar and with the drumlike device having three straight blades mounted at even intervals from one another, and three spiral blades mounted along each end of the drum and with the inner ends of each of the spiral blades connected to the respective adjacent ends of the straight blades, and with the straight and spiral blades projecting in advance of the cutter bar to reel the crop being cut against the cutter bar, and with the spiral blades thereafter acting to auger the cut crop along curved trough members to a center opening between the trough members whereby the crop may be deposited on the ground as a windrow with a relatively narrow path. The trough members have a greater curvature at their inner ends than at their outer ends and a diagonal rib tending to guide the cut crop along the trough member in a direction toward the center opening.

Figure 1:
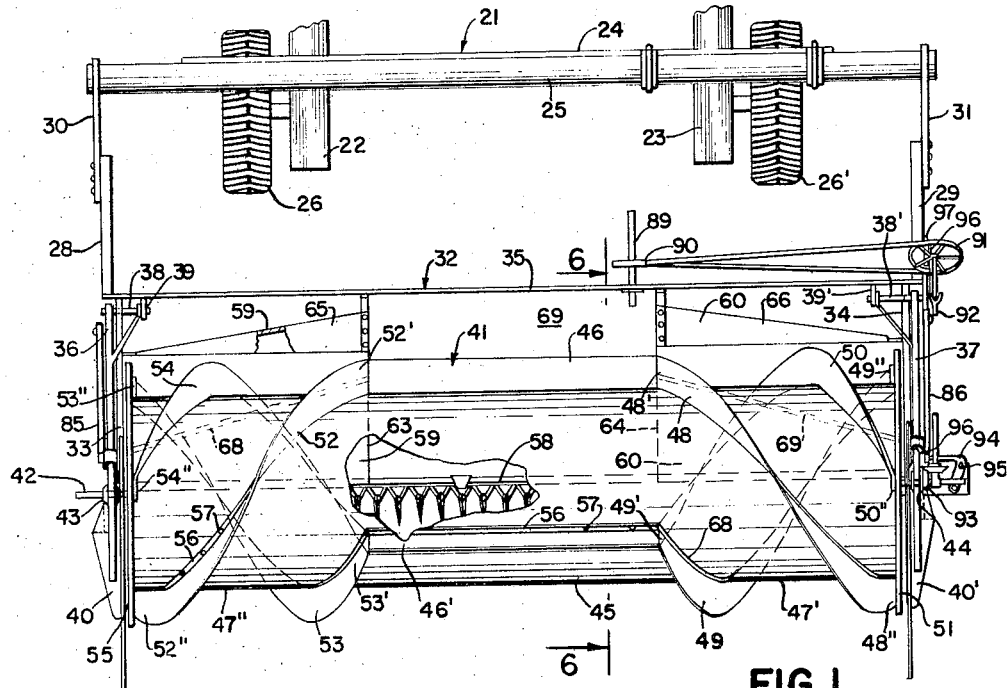
FIGURE 1 is a top plan view of the novel reel auger swathing attachment illustrating the first form of reel auger, having a continuous cylindrical drum extending from one end of the reel auger to the other.
Figure 2:
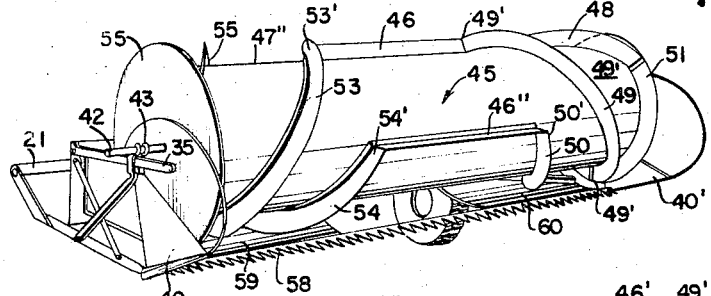
FIGURE 2 is a perspective view of the first form of reel auger.

With further more detailed reference to the drawings, in FIGURE 1 the swathing attachment 21 is illustrated. The swathing attachment is conventionally mounted to a tractor (not shown) by means of spars 22 and 23. The spars 22 and 23 are attached to a cross bar 24 of a swathing attachment which cross bar has brackets to pivotally support a shaft 25. The swathing attachment is also supported by a pair of wheels 26 and 26' in a conventional manner and is adapted to pivot about the axis of the shaft 25 to raise and lower the forward end 27 of the swathing attachment relative to the ground, the raising and lowering being accomplished by conventional hydraulic means (not shown) well known in the art.

The swathing attachment 21 has a pair of elongated spars or beams 28 and 29 which are fixed to relatively short side flanges 30 and 31 and the side flanges 30 and 31 are fixed to the shaft 25. At the forward end of the spars 28 and 29 is a conventional boxlike frame 32. The boxlike frame has a pair of side walls 33 and 34 and a back wall 35 with a pair of triangular shoes 40 and 40' fixed to the forward edge of said side walls 33 and 34 to guide the frame relative to the ground.

A pair of supporting arms 36 and 37 are pivotally mounted on each side of the boxlike frame where the sidewalls and back wall intersect. The arms 36 and 37 are pivotally supported by a pair of pivot rods 38 and 38' and a pair of brackets 39 and 39' projecting from the back wall support the pivot rods, with the arms pivoting about the axis of the pivot so as to be raised and lowered.

The reel auger 41 has a longitudinal shaft 42 extending the length of the reel auger with its projecting ends mounted in ring bearing members 43 and 44 fixed to the supporting arms 36 and 37 along the opposite sides of the frame so that raising and lowering of the arms 36 and 37 will raise and lower the reel auger 41.

The reel auger 41 has an elongated cylindrical drum 45 extending the entire length of the reel auger in the first form of the invention illustrated in FIGURE 1, with three straight elongated blade members 46, 46' and 46" mounted along the central portion of the drum 45, at 120° intervals from one another, and riveted thereto.

Along the right end portion 47 as viewed from FIGURE 1, are three elongated helical or spiral blades 48, 49 and 50, each parallel with one another and wound helically around the drum in separate parallel helical paths. The helical blades have their inner ends 48', 49' and 50', respectively, fixed or welded to the straight blades 46, 46' and 46", respectively, with outer ends 48", 49", and 50" of the spiral blades riveted to a circular disc plate 51. The circular disc plate is enlarged with respect to the cylindrical drum 45 so as to have the same radius at its outermost edge as the helical blades with respect to the longitudinal axis of the drum.

Along the left end portion 47' of the drum 45, as viewed from FIGURE 1, are three helical or spiral blades 52, 53 and 54, wound in an opposite direction to the helical blades 48, 49 and 50. The helical blades 52, 53 and 54 are helically wound around the left end portion with their inner ends 52', 53' and 54' respectively, welded or fixed to the straight blades 46, 46' and 46" respectively, and with their outer ends 52″, 53″ and 54″ riveted to an enlarged circular disc plate 55 mounted at the end of the drum and similar to disc plate 51. The helical blades 52, 53 and 54 are also spaced 120° from one another along separate parallel helical paths.

The three helical blades 48, 49 and 50, as well as the three helical blades 52, 53 and 54, each extend about an arc of slightly over 180° from their inner ends to their outer ends. See FIGURES 6 and 7. Also, the helical or spiral blades 48, 49, 50, 52, 53 and 54, as well as the straight blades, each have a continuous lateral inner mounting flange 56 for riveting and thereby fixing the blades to the cylindrical drum 45 with rivets 57.

A conventional reciprocating cutter bar 58 is mounted directly beneath the reel auger 41 and extends parallel to longitudinal axis of the reel auger from one end of the reel auger to the other, with the ends of the cutter bar being mounted to the forward ends of the spars 28 and 29. Thus, the reciprocating blade of the cutter bar may thereby cut a swath equal in length to the auger reel.

Mounted beneath the auger reel 41 are a pair of sheet metal auger troughs 59 and 60. The auger trough end has a generally frusta conical segmented form with their outer ends 61 and 62 each curving along a path having a shorter radius than the radius of curvature of the inner ends 63 and 64. Each trough member 59 and 60 has its upper end folded to form triangular flanges 65 and 66. Consequently, the triangular flanges 65 and 66 are formed integrally with the body 67 and 68 of the trough members 59 and 60.

The folded triangular flanges 65 and 66 at the top of each trough act as a roof guard against the back of the spiral blades to prevent the cut crop being augered to the center opening 69, between the troughs, from being swept upward and out of the trough members.

Each of the trough members has an elongated rib member 68 and 69 of angle iron which extends diagonally toward the inner upper end of each trough member and is fixed or riveted thereto, as illustrated in FIGURE 8. The rib members tend to guide the cut crop along the trough members to the center opening 69 between the troughs, so that the cut crop may fall in a windrow forming a relatively narrow path.

A pair of elongated brackets 70 and 71 each have their upward inclined forward ends riveted to the triangular flanges 65 and 66 respectively, and have upwardly bent rearward ends 72 and 73 riveted to the back wall 35 of the boxlike frame. The brackets 70 and 71 act to secure the upper inner ends of the trough members in a location behind the reel auger and act to attach the trough to the rear wall 35.

The trough members each have their forward edge 74 and 75 fixed to the back of the cutter bar 58, while the outer side edges or ends 61 and 62 of the end trough member have spaced lugs 76 formed integrally the trough members and provide means to secure the outer sides of the trough members to the side walls 33 and 34 by means of bolts 77.

Figure 3:
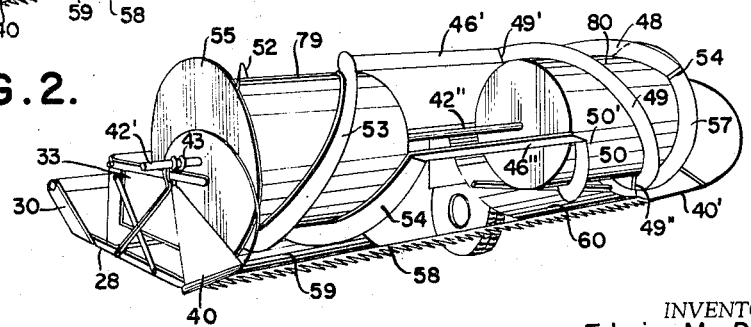
FIGURE 3 is a perspective view of the second form of reel auger disclosing the reel auger constructed of two separately spaced drum members.

In the second form of the reel auger 78, illustrated in FIGURES 3, 4, and 7, the reel auger does not have a central cylindrical drum portion in the area of the straight blades, rather the reel auger has two spaced drum portions, the central cylindrical drum portion being removed to provide better usability. Consequently, the modified reel auger 78 is formed by two separate drum members 79 and 80, spaced from each other only along the opposing end of the reel auger where the helical or spiral blades are located. The drum members 79 and 80 each have a pair of circular disc plate members 81 and 82 with an outer circumference which is the same circumference as the spaced drum members 79 and 80 and the plate members 81 and 82 are mounted across the inner open ends of the drum members 79 and 80 to close the inner ends as well as to provide an inner support for the straight blades, helical blades and spaced drum members.

Lugs 83 are formed integrally with the inner portions of the drum members 79 and 80, having threaded apertures to mounted threaded bolts and the like through the disc plates 71 and 82 to secure the disc plates to the drum members as illustrated in FIGURES 4 and 7.

The remainder of the structure of the second form reel auger as illustrated in FIGURES 3, 4 and 7 is identical to the first form of the invention, previously described and set out in FIGURES 1, 2, 5 and 6, including the trough members set out in FIGURE 8.

The modified reel auger is provided with the straight blades 46, 46′, 46″ and the helical blades 48, 49 and 50, 52, 53 and 54 and circular end plates 51 and 55. A shaft 42′ supports the end drum portions 79 and 80 coaxially in the same manner as the shaft 42, except that the center portion 42″ of the shaft is exposed and the trough members 59 and 60 and cutter bar 58 are mounted beneath the reel auger and to the spars in the same manner as described in the first form and straight blades 46, 46′ and 46″ are similarly welded to the spiral blades at their outer ends and rest upon the circular disc plate members 81 and 82 with the spiral blades having their inner flanges riveted to the drum members 79 and 80 in the same manner as in the first form.

In the illustrated structure of FIGURES 1 through 8, the overall length of the reel auger is approximately 11 feet 6 inches, from disc plate 51 to disc plate 55. The straight blade portion of the drum between the helical blades has a length of 4 feet 6 inches.

Thus, a swath of approximately 11 feet 10 inches can be cut during harvesting by a reel auger device and windrowed along a central path of approximately 4½ feet.

Similarly, when the reel auger is used in conjunction with a combine having a rearwardly moving platform or canvas, the platform or canvas need only have a width of 4½ feet for a swath of approximately 11 feet 10 inches.

The plurality of helical blades 48, 49, 50, 52, 53 and 54 in forming separate parallel independent helical paths at intervals about the circumference of the drum increases the effectiveness of the reeling in of the crop since for every one revolution of the drum, three helical blades have engaged the crop to reel in the crop against the cutter bar for cutting, as the swathing attachment is moved forward through the field during the harvesting operation.

The trough members 59 and 60 each have a larger radius at their inner ends 63 and 64 than at their outer ends 61 and 62 to facilitate the movement of the cut crop along the trough members toward the center opening 69 in response to the augering rotational movement of the helical blades.

The cylindrical drum surfaces along their end portions 47′ and 47″ of the drum where the helical blades are mounted have a fairly large circumference with respect to the overall circumference of the reel auger including the blades. The outer diameter of the cylindrical drum itself as illustrated has a diameter of 3 feet and the diameter of the reel including drum and blades, as illustrated in FIGURES 4, 6 and 7 is 4 feet. Thus, helical or spiral blades as well as the straight blades, each have a uniform height of ½ foot.

The large cylindrical surface of the drum and portions 47′ and 47″, as well as spaced drums 79 and 80, are relatively large with respect to the overall circumference of the reel auger, including its blades, and act as a relatively close back-up support for the cut crop to facilitate moving the cut crop onto the trough member and augering the crop laterally along the trough members generally parallel to the longitudinal axis of the drum to the center opening.

The pitch of the spiral blades or pitch, is made relatively wide to enable the blades to engage the crop in as flat a manner as possible, to improve the reeling action, and it is found that the pitch illustrated effectively reels the crop against the cutter bar and also effectively cooperates with the trough members to auger the crop to the central opening.

Although the illustrated length of the reel auger has been found satisfactory for combining and swathing the reel auger can preferably be made any length between 10 and 20 feet (from disc plate 51 to disc plate 55), and may be made larger than illustrated by extending the helical blade portions of the reel auger embodiment, or in other words, by extending the augering portions 47′ and 47″ of the first form and the spaced drums 79 and 80 of the modified form.

Thus, if the swath were to be increased to approximately 19 feet 2 inches, it may preferably be accomplished by doubling the length of the drum of each helical or spiral blade portion 47′ and 47″ of FIGURE 1 and 79 and 80 of FIGURE 4 from 3 feet 8 inches to 7 feet 4 inches, whereas the straight blade portions may remain the same, namely 4 feet 6 inches.

Also, in doubling the length of the spiral blade portion of the reel auger, the helical or spiral blades would preferably maintain the same radius and would preferably maintain the same pitch or angle but would simply be extended along their same helical paths a further distance. Thus, in doubling the spiral blade portions, each spiral blade or helical blade would, instead, wind about an arc of approximately 420° or double that shown in FIGURES 6 and 7.

The auger troughs 59 and 60, beneath the spiral blade portions would preferably be extended in length equally with the extension of the spiral blade portions. Although the outer radius of curvature formed by the edges 61 and 62 and the inner radius of curvature formed by the edge 63 and 64 may preferably remain approximately the same and may be spaced approximately the same radially from the reel auger, and the height of the triangular flanges formed by the edge 83 and 84 may remain approximately the same, the resultant angle formed between the folded edge 85 and the base 85′ would accordingly be shallower if the length of the trough were doubled as the length of the base 85′ would be doubled.

The trough members though extended, would still have a longer inner radius than outer radius, to facilitate the movement of the cut crop toward the center opening between the trough members.

In both forms of the invention, the reel augers 41 are rotatably supported in the same manner by the conventional supporting arms 36 and 37, pivotally mounted to the back of the boxlike frame 32, so that the reel auger may be adjusted to different heights, relative to the reciprocating cutter bar 58.

The supporting arms are raised and lowered by a second set of supporting arms 85 and 86 which pivot about their rotational mountings on the spars 28 and 29 to engage the supporting arms 36 and 37. The second set of arms each have a roller 87 mounted to their upper ends to provide a rolling engagement with the supporting arms, and cables are mounted at their forward ends to each of the arms 85 and 86 with their rearward ends leading to a hydraulic cylinder to conventionally activate and deactivate and thereby draw and release the cables rearwardly and forwardly, which thereby raises and lowers the set of arms and the supporting arms 36 and 37, between limits of lugs 88, and thereby raises and lowers the reel auger relative to the troughs and cutter bar, this raising and lowering just described being conventional and well known in the art and disclosed in Patent No. 2,808,695 being only briefly described.

The reel auger in both forms, FIGURE 1 or FIGURE 4, may be rotated for reeling and augering by one suitable drive, such as a conventional belt drive or a conventional gear drive generally illustrated in FIGURE 1, wherein the shaft 89 is driven by a suitable power source (not shown (and drives in turn a pulley 90, which drives a pulley wheel 91 through a belt drive. The pulley wheel 91 in turn rotates a shaft 92, with the shaft 92 having a conventional universal joint to accommodate the raising and lowering of the reel auger and the shaft 92 has a gear at its forward end which turns a gear 93 which gear 93 is fixed co-axially to the drum shaft 42 to thereby rotate the reel auger.

The cutter bar is of a conventional type having knife guards 58′ fixed to and disposed at intervals along the front of a longitudinal spar, which spar is fixed to the spars 28 and 29 and extends therebetween and is also fixed to and extends parallel along the front of the trough members. The cutter bar also has an upper notched reciprocating blade 58″, which reciprocates back and forth by conventional means such as an L-shaped arm 94 which pivots about a pivot point 95 with one leg loosely fitted in a notch in the reciprocating upper blade and the other leg pivotally mounted to the end of the shaft 96. The shaft 96 at its other end is mounted eccentrically to a gear 97 to convert the rotary drive of 97 to a reciprocating motion for the L-shaped arm 94 and the gear 97 is driven by a suitable source of power in a conventional manner.

In its operation, in both forms of the invention, the straight blades act to sweep and reel the crop straight back against the cutter bar, while the spiral blades on either side also set to reel the crop rearwardly against the cutter bar for cutting and the helical blades thereafter cooperate with the trough members to thereafter auger and convey the crop along the curved troughs to the center opening.

It will be obvious that various changes and departures may be made in the invention without departing from the spirit and scope of the invention and accordingly it is not intended that the invention be limited to that specifically disclosed in the specification or illustrated in the drawings but only as set forth in the appended claims werein:

What is claimed is:

1. A harvester device comprising a reel auger, said reel auger comprising an elongated cylindrical drum, at least three straight blade members mounted parallel to the longitudinal axis of the drum and extending along the central portion of the drum, at least three spiral blades wound parallel with one another along one end of said drum, at least three spiral blades wound parallel to one another along the other end of said drum in reverse pitch to said first mentioned spiral blades with each of said spiral blades having their inner ends fixed to ends of said straight blades, a pair of troughs mounted beneath said blades along the ends of the drum, said troughs having diagonal guide means to facilitate guiding the severed crop along the troughs in a direction generally parallel to the length of the drum, a cutter bar beneath said reel auger and extending parallel to the longitudinal axis of said reel auger, said troughs having their forward lower edge fixed to said cutter bar.

2. A harvester device comprising a frame and reel auger, said reel auger comprising a cylindrical drum, a pair of annular disc-like members mounted at each of the remote ends of said drum, a set of at least three straight elongated blades extending in length parallel to said drum disposed at intervals about the circumference along the central portion of said drum, a set of at least three spiral blades wound parallel with one another and spaced from one another along one end of said drum with each of said spiral blades having its inner end fixed to one of the ends of the straight blades and with its outer end fixed to one of said disc members, another set of at least three spiral blades spaced from one another and wound parallel along the other end of said drum with their inner ends fixed to the other ends of said straight blades and their outer ends fixed to the other of said disc members, a pair of sheetlike members forming troughs beneath said sets of spiral blades, said sheetlike members each having a diagonal guide member extending at an angle to the longitudinal axis of the drum along a path rearward and inward toward one another to facilitate guiding of a severed crop along the members in a direction generally parallel of the length of the drum and toward the central portion of the drum, a cutter knife and knife guards directly beneath said drum with said members each having their forward ends fixed to said knife guards, said drum and spiral blades having their forward edge portions projecting forward of said knife guards when said guards are pointed horizontally or are inclined downward during harvesting.

3. A harvester device comprising an elongated reel auger, a cutter bar, said reel auger being mounted above said cutter bar and being substantially co-extensive in length therewith, said reel auger comprising cylindrical drum means, a set of at least three spiral blades along one end of said drum means and a second set of at least three spiral blades along the other end of said drum means, a pair of sheetlike members forming a bottom and back wall beneath said first and second sets of spiral blades said sheetlike members having their inner edges of their back wall diverging away from said spiral blades at a greater angle than their outer edges.

4. A harvester device comprising an elongated reel auger, a cutter bar including knife guards, said reel auger being mounted above said cutter bar and being substantially co-extensive in length therewith, said reel auger comprising a set of spiral blades along one end of said reel auger, a set of spiral blades along the other end of said auger, drum means supporting each set of spiral blades, with an opening therebetween, disc members covering the inner and the outer ends of each of said drum means, said spiral blades having their outer ends connected to the outer disc members, a pair of curved shaped sheetlike members forming a back and bottom wall for said sets of spiral blades and an opening therebetween, said drum means and spiral blades having their forward edge portions projecting forward of said knife guards when said knife guards are pointed horizontally or inclined downward during harvesting.

5. A harvester device comprising a reel auger, said reel auger comprising elongated cylindrical drum means, a set of at least three spiral blades spaced from one another along one end of the drum means, a second set of at least three spiral blades spaced from one another and wound parallel to one another along the other end of said drum means in reverse pitch to said first set, an elongated reciprocating cutter bar including knife guards disposed parallel to and along the bottom of said drum means, said drum means and spiral blades having their forward edge portions projecting forward of said knife guards when said guards are pointed horizontally or inclined downward during harvesting, trough means beneath said first and second set of spiral blades having their forward edges mounted to said knife guards and projecting rearward and upward, guide means mounted on the surface of the trough means adjacent the drum means to facilitate the movement of harvested material along the trough means.

6. A harvester reel auger comprising an elongated cylindrical drum, a set of at least three spiral blades spaced from one another and wound parallel to one another along one end of said drum, a second set of at least three spiral blades spaced from one another and wound parallel to one another along the other end of said drum in reverse pitch to said first set, an elongated reciprocating cutter bar including knife guards disposed parallel to and along the bottom of said drum, said drum and blades having their forward most surfaces projecting forward of said knife guards when said guards are either pointed horizontally or inclined downward during harvesting, trough means beneath said first and second set of spiral blades, said trough means having their forward edge surfaces mounted to said knife guards and projecting rearward and upward along the back of said drum and blades and diverging gradually away therefrom with the uppermost edge of said trough means terminating below the uppermost surfaces of said drum, flanges projecting forward from said uppermost edges of said trough means toward said spiral blades along the rearward portions of said drum.

7. A harvester device comprising an elongated rotatable drum, a set of three spiral blades wound along one end of said drum, a second set of three spiral blades wound along the other end of said drum, a reciprocating cutter including knife guards mounted beneath said spiral blades and parallel to the rotational axis of said drum, a trough member beneath each of said sets of spiral blades, each said trough member having its radius at its inner edges adjacent the central portion of said drum slightly larger than its radius at its outer edges adjacent the outer edges of said drum, said trough members having their front edges mounted to said knife guards.

8. A harvester device comprising an elongated central rotating support, a set of three spiral blades wound along one end of said support, a second set of three spiral blades wound along the other end of said support, a reciprocating cutter including knife guards mounted beneath said support and blades and parallel to the rotational axis of said support, a trough member beneath each of said sets of spiral blades with its radius at its inner edges adjacent the central portion of said support larger than its radius at its outer edges adjacent the outer edges of said support, said trough members having their front edges mounted to said knife guards of said cutter.

9. A harvester device according to claim 5, wherein said drum means has annular flange means along its outer ends and said spiral blades have their outer ends connected to said flange means.

References Cited by the Examiner
UNITED STATES PATENTS

| | | | |
|---|---|---|---|
| 2,212,465 | 8/1940 | Baldwin | 56—20 |
| 2,455,905 | 12/1948 | Ronning et al. | |
| 2,476,265 | 7/1949 | Peterson | 56—158 |
| 2,478,009 | 8/1949 | Pool | 56—158 X |
| 2,636,335 | 4/1953 | Whitney | 56—192 |
| 2,978,097 | 4/1961 | Blanshine | 198—217 |
| 3,023,560 | 3/1962 | Krahn | 56—23 |

ABRAHAM G. STONE, *Primary Examiner.*

RUSSELL R. KINSEY, T. GRAHAM CRAVER,
*Examiners.*